US011036918B2

(12) United States Patent
Mullins et al.

(10) Patent No.: US 11,036,918 B2
(45) Date of Patent: Jun. 15, 2021

(54) MULTIMODAL SHARING OF CONTENT BETWEEN DOCUMENTS

(71) Applicant: Microsoft Technology Licensing, LLC, Redmond, WA (US)

(72) Inventors: Christopher Lee Mullins, Sammamish, WA (US); Jonathan Edgar Fay, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 16/356,817

(22) Filed: Mar. 18, 2019

(65) Prior Publication Data

US 2019/0213240 A1  Jul. 11, 2019

Related U.S. Application Data

(63) Continuation of application No. 14/754,250, filed on Jun. 29, 2015, now Pat. No. 10,275,430.

(51) Int. Cl.
| | |
|---|---|
| G06F 17/00 | (2019.01) |
| G06F 40/131 | (2020.01) |
| G06F 40/123 | (2020.01) |
| G06F 40/166 | (2020.01) |
| G06F 40/197 | (2020.01) |
| G06F 3/0482 | (2013.01) |
| G06F 3/0484 | (2013.01) |

(52) U.S. Cl.
CPC .......... *G06F 40/131* (2020.01); *G06F 3/0482* (2013.01); *G06F 3/04842* (2013.01); *G06F 40/123* (2020.01); *G06F 40/166* (2020.01); *G06F 40/197* (2020.01)

(58) Field of Classification Search
CPC .... G06F 40/131; G06F 40/166; G06F 40/123; G06F 40/197; G06F 3/0482; G06F 3/04842

See application file for complete search history.

(56) References Cited

U.S. PATENT DOCUMENTS

| | | | | |
|---|---|---|---|---|
| 6,230,173 | B1 * | 5/2001 | Ferrel | G06F 40/166 |
| | | | | 715/205 |
| 6,976,210 | B1 * | 12/2005 | Silva | G06F 16/9577 |
| | | | | 715/205 |

(Continued)

FOREIGN PATENT DOCUMENTS

| | | |
|---|---|---|
| CN | 101350009 A | 1/2009 |
| CN | 102945226 A | 2/2013 |
| CN | 103034656 A | 4/2013 |

OTHER PUBLICATIONS

"First Office Action and Search Report Issued in Chinese Patent Application No. 201680038577.9", dated Jun. 17, 2020, 18 Pages.

(Continued)

*Primary Examiner* — Mohammed H Zuberi
(74) *Attorney, Agent, or Firm* — Michael Best & Friedrich LLP

(57) ABSTRACT

A facility for materializing a document is described. The facility identifies within the document a reference to a document fragment. The facility uses an identifier contained in the identified reference to retrieve document fragment contents stored separately from the document. The facility causes the retrieved document fragment contents to be displayed in context of the document.

20 Claims, 8 Drawing Sheets

(56) References Cited

U.S. PATENT DOCUMENTS

| | | | | |
|---|---|---|---|---|
| 8,239,759 | B1* | 8/2012 | Sundermeyer | G06F 40/166 715/255 |
| 8,577,866 | B1* | 11/2013 | Osinga | G06F 16/353 707/710 |
| 9,317,622 | B1* | 4/2016 | Zuromski | G06F 16/9577 |
| 9,703,766 | B1* | 7/2017 | Kyre | G06K 15/1814 |
| 10,210,142 | B1* | 2/2019 | Jain | G06F 16/94 |
| 10,776,566 | B2* | 9/2020 | DeVries | G06F 40/268 |
| 2002/0124109 | A1* | 9/2002 | Brown | G06F 40/166 709/246 |
| 2002/0156803 | A1* | 10/2002 | Maslov | G06F 40/154 715/234 |
| 2003/0028557 | A1* | 2/2003 | Walker | G06F 16/9024 715/201 |
| 2003/0177449 | A1* | 9/2003 | Rose | G06F 40/117 715/255 |
| 2004/0060002 | A1* | 3/2004 | Lucovsky | G06F 40/166 715/234 |
| 2004/0268236 | A1* | 12/2004 | Chidlovskii | G06F 40/166 715/234 |
| 2005/0120298 | A1* | 6/2005 | Petrujkic | G06Q 10/06375 705/7.13 |
| 2005/0165815 | A1* | 7/2005 | Ozzie | G06F 16/986 |
| 2006/0069987 | A1* | 3/2006 | Jones | G06F 40/14 715/246 |
| 2006/0075353 | A1* | 4/2006 | DeSpain | G06F 16/93 715/770 |
| 2006/0294459 | A1* | 12/2006 | Davis | G06F 40/166 715/205 |
| 2007/0043872 | A1* | 2/2007 | Pattan | H04L 65/1043 709/227 |
| 2007/0113172 | A1* | 5/2007 | Behrens | G06F 40/131 715/239 |
| 2007/0143666 | A1* | 6/2007 | Harrington | G06F 40/131 715/236 |
| 2007/0156743 | A1* | 7/2007 | Harrington | G06F 40/131 |
| 2007/0156744 | A1* | 7/2007 | Harrington | G06F 40/131 |
| 2007/0156745 | A1* | 7/2007 | Harrington | G06F 40/131 |
| 2007/0156768 | A1* | 7/2007 | Harrington | G06F 40/131 |
| 2008/0065671 | A1* | 3/2008 | Dejean | G06F 40/131 |
| 2008/0092084 | A1* | 4/2008 | Lapstun | G06F 3/0321 715/854 |
| 2008/0104497 | A1* | 5/2008 | Lumley | G06F 40/166 715/209 |
| 2008/0120608 | A1* | 5/2008 | Shetty | G06F 40/131 717/144 |
| 2008/0201365 | A1* | 8/2008 | Petri | G06F 40/197 |
| 2008/0256092 | A1* | 10/2008 | Kano | G06F 40/131 |
| 2009/0019353 | A1* | 1/2009 | Abrams | G06F 40/14 715/224 |
| 2009/0077111 | A1* | 3/2009 | Petri | G06F 40/154 |
| 2009/0083294 | A1* | 3/2009 | Gao | G06F 40/226 |
| 2010/0017426 | A1* | 1/2010 | Marston | G06F 40/174 707/E17.127 |
| 2010/0037145 | A1* | 2/2010 | Sides | G06F 40/131 715/744 |
| 2010/0100817 | A1* | 4/2010 | Trotter | G06F 40/131 715/261 |
| 2010/0223541 | A1* | 9/2010 | Clee | G06F 40/10 715/205 |
| 2011/0040784 | A1* | 2/2011 | Rousseau | H04L 9/3247 707/769 |
| 2011/0078165 | A1* | 3/2011 | Battle | G06F 40/131 707/756 |
| 2011/0131212 | A1* | 6/2011 | Shikha | G06F 40/263 707/741 |
| 2011/0320927 | A1* | 12/2011 | Jones | G06F 40/131 715/234 |
| 2012/0151312 | A1* | 6/2012 | Clee | G06F 40/134 715/205 |
| 2012/0290926 | A1* | 11/2012 | Kapadia | G06F 40/166 715/255 |
| 2012/0324350 | A1* | 12/2012 | Rosenblum | G06F 40/166 715/256 |
| 2013/0227396 | A1* | 8/2013 | Chinnathambi | G06F 16/972 715/235 |
| 2014/0019852 | A1 | 1/2014 | Numata | |
| 2014/0032604 | A1* | 1/2014 | Young | G06F 40/131 707/797 |
| 2014/0033088 | A1* | 1/2014 | Shaver | G06F 40/197 715/764 |
| 2014/0040714 | A1* | 2/2014 | Siegel | G06F 16/93 715/203 |
| 2014/0101540 | A1* | 4/2014 | King | G06F 16/93 715/255 |
| 2014/0129645 | A1* | 5/2014 | Mo | G06Q 10/101 709/205 |
| 2014/0164352 | A1* | 6/2014 | Denninghoff | H03H 9/25 707/711 |
| 2014/0324416 | A1* | 10/2014 | Lapshin | G06F 21/6209 704/9 |
| 2014/0344170 | A1* | 11/2014 | Le Chevalier | G06Q 50/184 705/310 |
| 2015/0008256 | A1 | 1/2015 | Beadles | |
| 2015/0066968 | A1* | 3/2015 | Bastide | G06F 3/0482 707/758 |
| 2015/0134594 | A1 | 5/2015 | Sethumadhavan et al. | |
| 2015/0161086 | A1* | 6/2015 | Wu | G06F 3/04842 715/234 |
| 2015/0170322 | A1* | 6/2015 | Graffagnino | G06F 40/131 345/503 |
| 2016/0378724 | A1* | 12/2016 | Mullins | G06F 40/123 715/229 |
| 2016/0378725 | A1* | 12/2016 | Marchsreiter | G06F 40/166 715/255 |
| 2016/0378733 | A1* | 12/2016 | Mullins | G06F 3/04847 715/255 |
| 2016/0378734 | A1* | 12/2016 | Mullins | G06F 40/131 715/229 |
| 2016/0381139 | A1* | 12/2016 | Mullins | H04L 67/327 709/217 |
| 2017/0068442 | A1* | 3/2017 | Kawamura | G06F 3/04842 |
| 2017/0103059 | A1* | 4/2017 | Cai | G06F 40/137 |
| 2017/0103066 | A1* | 4/2017 | Kisin | H04L 67/06 |
| 2017/0199657 | A1* | 7/2017 | Mullins | G06F 40/197 |
| 2017/0344526 | A1* | 11/2017 | Smith | G06F 40/131 |
| 2017/0351656 | A1* | 12/2017 | Lysanov | G06F 3/0486 |
| 2018/0137681 | A1* | 5/2018 | Chang | G06F 3/017 |
| 2018/0225259 | A1* | 8/2018 | Alba | G06F 40/258 |
| 2018/0225277 | A1* | 8/2018 | Alba | G06F 40/106 |
| 2018/0300309 | A1* | 10/2018 | Denoue | G06F 40/131 |
| 2019/0036853 | A1* | 1/2019 | Denoue | H04L 51/046 |

OTHER PUBLICATIONS

Microsoft Windows 95 Resource Kit, Published by Tsinghua University Press, Feb. 28, 1997, 5 Pages.

Weifeng, Shao, "The Design and Implementation of a Structural Document Version Management System for a cooperative Editing System", Submitted in the Chinese Master's Theses Full-Text Database—Information Science & Technology (Monthly), No. 12, Dec. 15, 2006, 43 Pages.

Xiaoming, et al., "10 Mega Business Trends in the Digital Age", Published by Shanghai Jiao Tong University Press, Dec. 31, 2014, 7 Pages.

"Second Office Action Issued in Chinese Patent Application No. 201680038577.9", dated Feb. 19, 2021, 9 Pages.

* cited by examiner

300

301 Thank you for buying this Microsoft product! We value your business.

*FIG. 3* fragment version instance directory table ⟋-1000

| fragment version ID | server ID | |
|---|---|---|
| 12345498 | 9103 | ⟋-1001 |
| 12345498 | 1231 | ⟋-1002 |
| 91285817 | 9103 | ⟋-1003 |
| 91285817 | 2254 | ⟋-1004 |
| 65489151 | 4545 | ⟋-1005 |
| 65489151 | 9103 | ⟋-1006 |
| 84321332 | 1231 | ⟋-1007 |
| 84321332 | 4658 | ⟋-1008 |
| ⟍-1011 | ⟍-1012 | |

*FIG. 10* fragment version instance content table ⟋-1100

| fragment version ID | update time | fragment contents | |
|---|---|---|---|
| 91285817 | 1/16/1987 16:02:54 | <image data> | ⟋-1101 |
| 65489151 | 9/15/2002 9:17:12 | Microsoft Corporation . . . | ⟋-1102 |
| 12345498 | 1/3/2001 10:32:19 | Microsoft Corp. . . . | ⟋-1103 |
| ⟍-1111 | ⟍-1112 | ⟍-1113 | |

*FIG. 11*

MULTIMODAL SHARING OF CONTENT BETWEEN DOCUMENTS

RELATED APPLICATIONS

This application is a continuation of U.S. patent application Ser. No. 14/754,250, filed Jun. 29, 2015, the entire content of which is incorporated by reference herein.

BACKGROUND

Electronic documents generated, updated, and presented using computer systems and other electronic devices can include content of a variety of types such as text, images, and spreadsheets.

As part of the process of conventionally generating an electronic document, it is common to create the document's content, and/or insert content copied from another source, such as a portion of another document. Content that is copied into a document from another source typically exists in the document independently of the source, failing to reflect any subsequent changes that the content undergoes in the source.

BRIEF DESCRIPTION OF THE DRAWINGS

FIGS. 3-5 are display diagrams showing the editing and display of a document incorporating a shared document fragment.

FIG. 10 is a table diagram showing sample contents of a fragment version instance table used by the facility in some embodiments to store information about fragment version instances.

FIG. 11 is a table diagram showing sample contents of a fragment version instance content table used by the facility in some embodiments to store fragment version instance content.

SUMMARY

Figure 1:
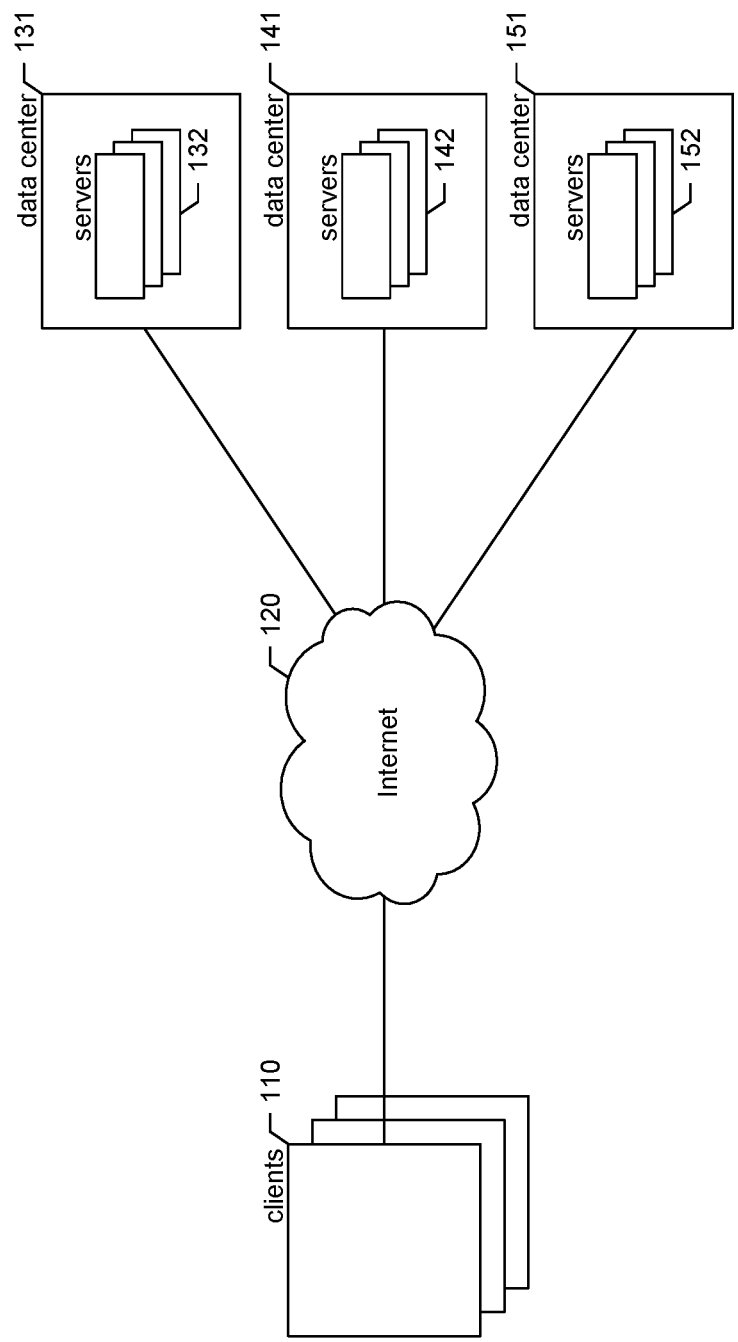
FIG. 1 is a network diagram showing the environment in which the facility operates in some embodiments.

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for materializing a document is described. The facility identifies within the document a reference to a document fragment. The facility uses an identifier contained in the identified reference to retrieve document fragment contents stored separately from the document. The facility causes the retrieved document fragment contents to be displayed in context of the document.

DETAILED DESCRIPTION

The inventors have recognized significant disadvantages in conventional approaches to incorporating pre-existing content into an electronic document. In particular, the inventors have recognized that such conventional approaches tend to dissociate content incorporated into a document from its source, as well as from other documents into which it is incorporated.

Accordingly, the inventors have conceived and reduced to practice a software and/or hardware facility that enables the user to share content between any number of documents in any of a variety of modes ("the facility").

A user can incorporate pre-existing content into a target document by, for example, selecting that content within the source document, then performing interactions for transferring the selected content to a particular position in the target document. In various embodiments, such interactions can be, for example, placing the selected content on the clipboard, then pasting it into the target document at the target position; dragging the selected content from the source document to the target position in the target document; etc.

In some embodiments, the facility stores documents using a construct called a "document fragment," or simply "fragment," which is a unit of document content represented separately by the facility. The document is comprised of a single "root fragment," which can directly contain content, as well as containing fragment references referring to other fragments. Those fragments referred to by the root fragment can themselves directly contain content and fragment references to other fragments, and so on. When a document is opened, the facility typically collects and synthesizes its contents by retrieving the root fragment, retrieving other fragments referred to by fragment references in the root fragment, retrieving further fragments referred to by fragment references in those fragments, and so on. In some embodiments, any fragment can be treated as a document, in the sense that it can be opened by an editing or presentation application as the root fragment.

In some embodiments, the facility stores the fragments making up users' documents in a cloud-based service, where they can be accessed from virtually any location. In some embodiments, this cloud-based service uses a technique called "erasure coding" in which it decomposes, or "shreds," a fragment defined by a document author into multiple smaller constituent pieces, or "shreds," each of which the facility stores on multiple storage devices in different data centers in different geographic locations to provide disaster and outage survivability. When the cloud-based service receives a request for a fragment, it retrieves and combines these shreds to reconstitute the fragment.

In some embodiments, the facility stores a new version of a fragment to reflect each editing action performed on the fragment, each identified by the date and time at which the editing action was performed. For example, in some embodiments, the facility creates a new fragment version for each character or group of characters that is inserted in the fragment—such as by a keystroke or a text block paste—and for each character or group of characters that is deleted—such as by a backspace keypress or a select-and-delete operation. In some embodiments, each fragment version identifies the author that took the editing action reflected by the fragment version. In some embodiments, after being written, these fragment versions cannot be altered, and are said to be "immutable."

In some embodiments, over time, the facility deletes some of the versions of a fragment, so as to collapse two or more editing actions into an undeleted version of the fragment. In some embodiments, in doing so, the facility deletes only contiguous fragment versions all reflecting editing actions by the same author and immediately preceding an undeleted fragment version also reflecting an editing action by the same author.

In some embodiments, where the content is incorporated from a fragment-aware source document, the facility ensures that the incorporated content corresponds precisely to one or more whole fragments; that is, where the selected content spans only a portion of a fragment in the source document, the facility breaks that fragment in the source document into two fragments, a first that contains only the content from the original fragment that was selected, a second containing the content from the original fragment that was not selected, so that the first can be incorporated into the target document while the second is not. Where the content is incorporated from a fragment-unaware source document, the facility creates a new fragment to contain the incorporated content.

In response to the incorporation operation, the facility creates a fragment reference in the target document at the position in the target document where the content was incorporated to represent the incorporated content in the target document. In some embodiments, the fragment reference contains multiple components, such as a current fragment ID component and/or an original component. The current fragment ID component of the created fragment reference identifies the fragment to which the reference refers, such as by containing a fragment ID for this fragment that can be used to retrieve this fragment. The origin component, where used by the facility, maintains in the fragment reference state the fragment ID of the fragment in which the incorporated content originated, which can serve as a basis for changing the mode in which the incorporated content is used in the target document throughout the life of the fragment reference, and for tracking the provenance of the fragment. In some embodiments, the facility stores an ordered list of fragment IDs in the origin component to reflect the series of fragments from which the referenced fragment has been forked.

In various embodiments, at the time the user performs the incorporation operation, the user can specify an initial mode for the incorporated content in the target document by, for example, holding down a certain keyboard key during the drag interaction, using a varying control key combination to paste the incorporated content into the target document, responding to a context menu or dialog displayed by the facility in response to the incorporation operation, etc. In some embodiments, each mode has two characteristics: (1) whether the contents of the fragment are editable in the context of the incorporating document or fragment ("editable in context") and (2) how a version of the referenced fragment is chosen for inclusion in the incorporating document or fragment ("version selection"). In some embodiments, the following kinds of version selection options are available: (a) "latest"—the version of the fragment with the most recent time is incorporated by the reference; (b) "time-specified"—a particular version of the fragment associated with a particular time is incorporated by the reference (e.g., in some embodiments, an arbitrarily specified time causes selection of the fragment version whose time is the latest among the fragments that are not later than the specified time); (c) "special"—special rules are used to specify which version of the fragment is selected for incorporation. Examples of special rules are the latest document approved by a qualified approval authority, or the earliest version embodying an edit by a particular author.

In various embodiments, the facility supports some or all of the following incorporation modes: live mode, follow mode, forkable mode, pinned mode, special forkable mode, and special follow mode.

Live mode (1) is editable in context and (2) uses "latest" version selection. Thus, in live mode, an author can change the content of the fragment, which results in a new version of the fragment being created to reflect each such change. These changes will appear in any other containing fragments that incorporate the same fragment, and whose version selection option ends up selecting this version, either (a) latest, or (b) special with a selection rule that selects this version. Live mode is typically used for a reference included to both revise the referenced fragment, and reflect the revisions of others. By virtue of using the latest version selection option, a reference in live mode incorporates the latest version of the fragment, no matter its content or which authors' revision it reflects. Where live mode is selected, the facility populates a current fragment ID component of the fragment reference with the same fragment ID as the origin component. The current component of the fragment reference identifies the fragment whose contents are to be retrieved for inclusion in the target document.

Follow mode (1) is not editable in context, and (2) uses latest version selection. In follow mode, the latest version of the fragment is always incorporated, but can't be edited in the context of the document or fragment containing the follow mode reference. Follow mode is typically used to incorporated dynamic content maintained by one or more other authors, in a centralized manner.

Forkable mode (1) is editable in context, and (2) uses time-specified version selection. In forkable mode, the fragment can be edited in the context of the reference from the fragment's state at the specified time. Performing such an edit transforms the reference from forkable mode to live mode; reflects the edit in the first version of a new fragment ID; stores the new fragment ID in the context of the reference; and stores the original fragment ID in the reference's origin component. Forkable mode is typically used where a particular state of a fragment is to be the basis for a new set of edits that won't affect documents or fragments incorporating the original fragment. Similarly, the forkable and resulting live reference aren't affected by edits to the original fragment subsequent to the forkable reference version selection time.

Pinned mode (1) is not editable in context, and (2) uses time-specified version selection. While the fragment reference is in pinned mode, the incorporated content cannot be changed, either by a user editing the document or fragment containing the pinned reference (because not editable in context precludes editing by such an author), or by a user editing the fragment in the context of a different containing document or fragment (because such edits will be reflected in a new version of the fragment, which will not be selected by the time-specified selection logic of this reference). Where pinned mode is selected, the facility populates the current component of the fragment reference with the fragment ID of the origin fragment. Pinned mode is typically used to preserve a particular state of the fragment in the referring document.

Special forkable mode (1) is editable in context, and (2) specifies a special version selection rule. The incorporated fragment will, at any given time, show the content of the version of the source fragment that is selected by the special version selection rule at the time. When an author edits the fragment in context, the forking process described above occurs. Special forkable mode can be used, for example, to use an evolving template whose edits are subject to periodic approval as a basis for creating instances of new content.

Special follow mode (1) is not editable in context, and (2) specifies a special version selection rule. Thus, a special follow reference shows the version of the fragment that satisfies the version selection rule at any given time, which is not editable in context. This mode can be used, for example, to pull into a document or fragment centrally-authored content that is periodically rereleased by its authors to reflect all edits occurring since the last release.

A user may at any subsequent time change the mode of the incorporated content via various user interface techniques, such as by right-clicking on the incorporated content and selecting an item from a resulting context menu, selecting incorporated content and choosing a menu-bar menu item, interacting with a specialized control that is displayed when the mouse cursor hovers over the incorporated content, etc. In some embodiments, the facility incorporates or interoperates with a system of authority and access controls and other content governance measures limit the actions that can be taken by a particular user with respect to a particular document or fragment in various circumstances, including changing the mode of an existing fragment reference.

In some embodiments, when retrieving the time-specified fragment version for content incorporated in pinned mode, the facility notifies the user if a version of the origin fragment that is more recent than the read-only fragment to enable the user to switch the mode to live, or remain in pinned mode but replace the time specified for the version in the reference with the time corresponding to the latest version.

In some embodiments, the facility maintains metrics on the incorporation of fragments into documents to be able to report on various "hot fragments" measures, which identify fragments that are incorporated into the most total documents, or fragments that have been incorporated into the most documents during a recent period of time, across an organization or another group of users, among a group or category of documents, etc.

By operating in some or all of the ways described above, the facility enables document authors to flexibly and efficiently leverage existing content, including in cases in which the content continues to evolve. In addition, the facility tends to reduce requirements for computer resources—such as storage space; increase reliability—such as data integrity and security; and increase usability—such as being able to edit the complex document anywhere in the world.

FIG. 1 is a network diagram showing the environment in which the facility operates in some embodiments. The network diagram shows clients 110 each being used by a different user. Each of the clients executes software enabling its user to create, revise, and present electronic documents. Software on the client also enables the client to retrieve and synthesize remotely-stored document contents, including document fragments. In particular, the Internet 120 or one or more other networks connect each of the clients to a number of different data centers, e.g., data centers 131, 141, and 151, which in some embodiments are distributed geographically to provide disaster and outage survivability, both in terms of data integrity and in terms of continuous availability. Distributing the data centers geographically also helps to minimize communications latency with clients in various geographic locations. Each of the data centers contain servers, e.g. servers 132, 142, and 152. The servers access storage devices containing document contents, including document fragments, and execute software for responding to requests from clients and other servers to store and retrieve document contents, again including document fragments. In various embodiments, the facility uses various different distributions of responsibility for retrieving and combining document fragments between the clients and the servers.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different devices may be used as clients, including desktop computer systems, laptop computer systems, automobile computer systems, tablet computer systems, smart phones, personal digital assistants, televisions, cameras, etc.

Figure 2:
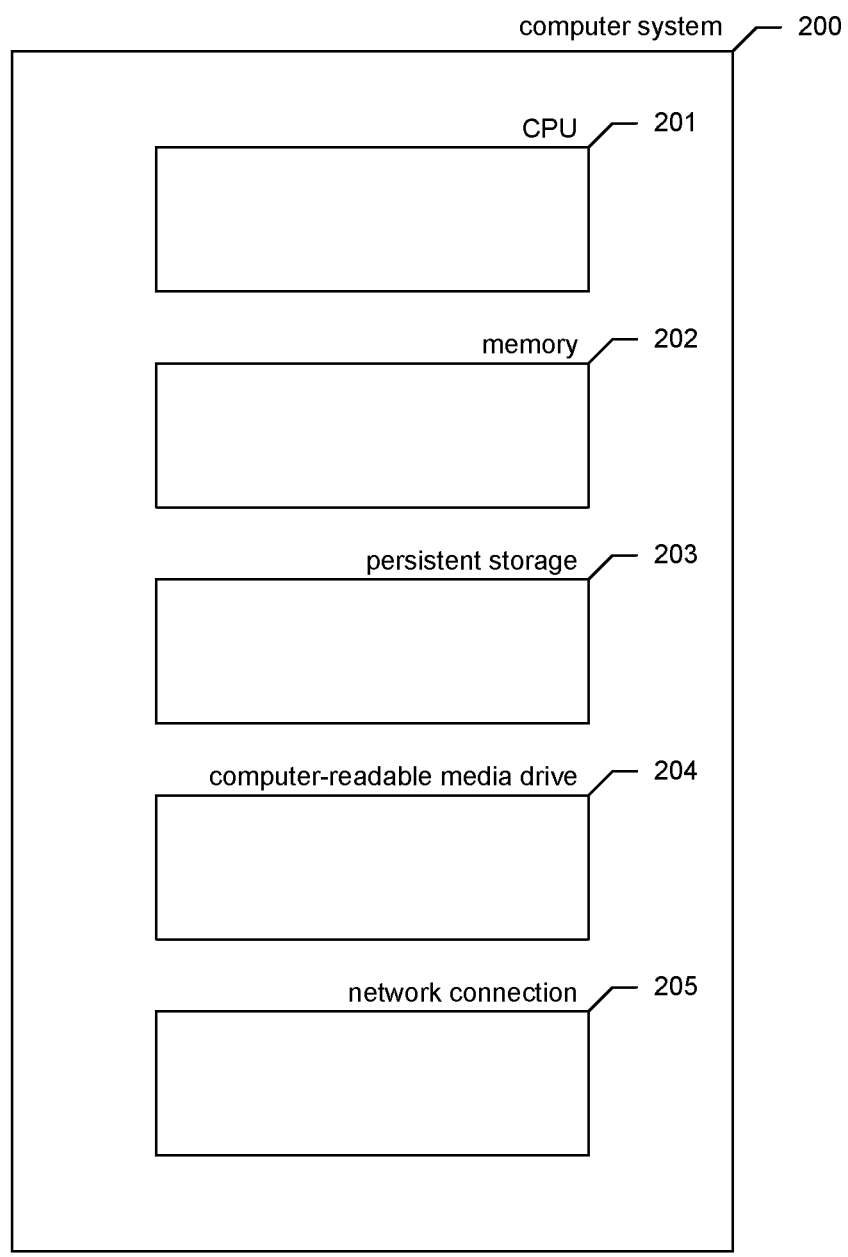
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 5:
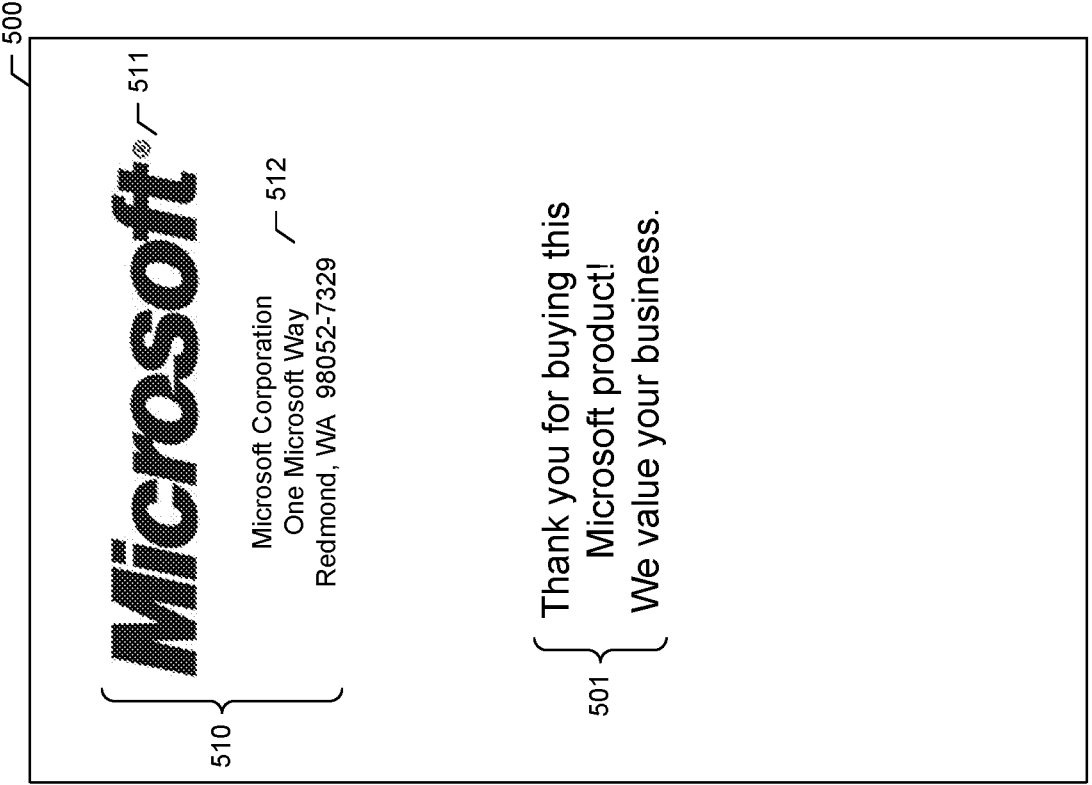
Figure 4:
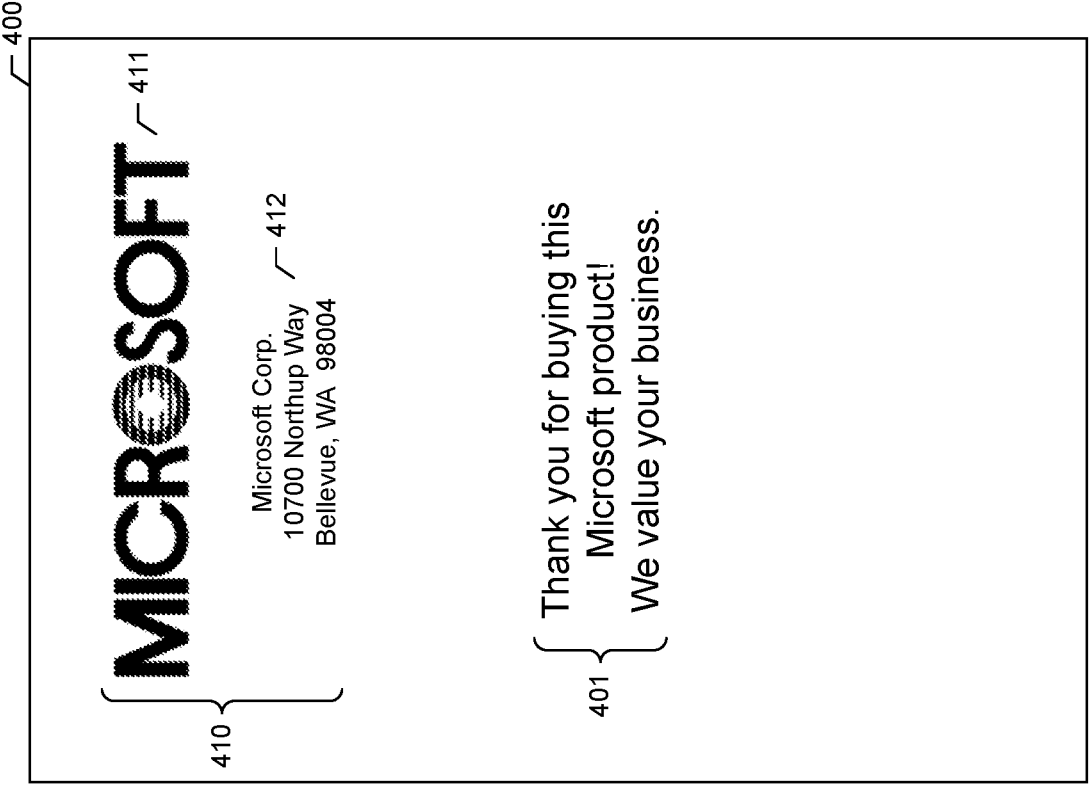

FIGS. 3-5 are display diagrams showing the editing and display of a document incorporating a shared document fragment. FIG. 3 is a display diagram showing a sample target document at a time before the shared document fragment is incorporated. The target document 300 includes text 301. This text may be directly contained by the root fragment for the target document, or may be contained by a fragment identified by a fragment reference within the root fragment for the target document.

FIG. 4 is a display diagram showing the sample target document at a time immediately after the shared document fragment is incorporated. At this time, the target document 400, in addition to containing text 401, contains incorporated content 410 transferred from a source document (not shown). The incorporated content constitutes a company's letterhead, including both an image 411 of the company's logo and the company's textual address 412.

Where the user incorporates the letterhead content in pinned mode, the letterhead content will remain unchanged in the target document unless and until the incorporation is changed to a different mode. Where the user incorporates the letterhead content in forked mode, the user can change the letterhead content in the context of the target document; such changes will not affect the letterhead content in the source document, and any changes to letterhead content in the source document will not be reflected in the target document. Where the user incorporates the letterhead content in live mode, the user can, subject to any applicable permissions, change the letterhead content in the context of the target document, and doing so will change the letterhead content in the source document and any other document that incorporates the letterhead content in live mode. Similarly, changes to the letterhead content via the source document or any other document that incorporates the letterhead content in live mode will be reflected in the target document.

FIG. 5 is a display diagram showing the sample target document where, after the shared document fragment is incorporated into the target document in live mode, the content is changed in the context of the source document, such as by another user. It can be seen that, in the target document 500 at this time, the letterhead content 510 contains a new company logo 511 and a new company address 512, both substituted in the context of the source document, and reflected in the target document pursuant to the target document's incorporation of this content in live mode.

Figure 6:
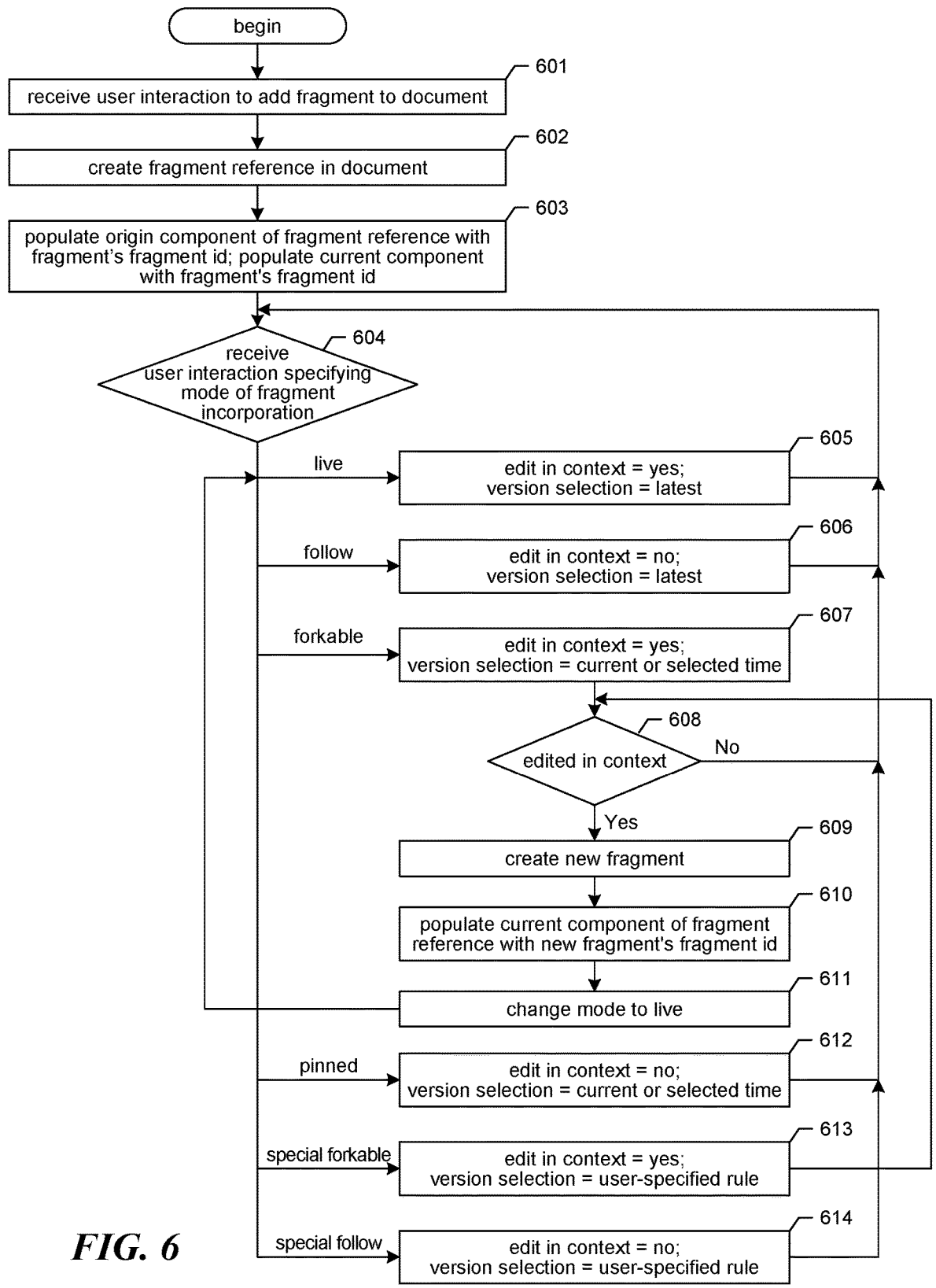
FIG. 6 is a flow diagram showing steps typically performed by the facility in some embodiments in order to incorporate a document fragment into a document, and adjust the mode of its incorporation.

FIG. 6 is a flow diagram showing steps typically performed by the facility in some embodiments in order to incorporate a document fragment into a document, and adjust the mode of its incorporation. In step 601, the facility receives a user interaction to add a fragment to a target document. In various embodiments, such interactions can be, for example, copying the selected content onto the clipboard, then pasting it into the target document at the target position; dragging the selected content from the source document to the target position in the target document; etc. Where the user selects content to add to the target document that don't exactly correspond to whole existing fragments, the facility creates one or more fragments to which the selected content does exactly correspond, such as by subdividing fragments that occur in the source document. In some cases, this involves altering and/or adding fragment references in the source document, and in one or more other documents incorporating the same content in live mode.

In step 602, the facility creates a fragment reference in the target document. In step 603, the facility populates both the origin component of the fragment reference and its current component with the fragment ID of the fragment added to the document. In step 604, the facility receives a user interaction specifying a mode for incorporating the fragment in the target document. In some embodiments, a single interaction or a related sequence of interactions can both add the fragment to the document and specify a mode. If the user action received in step 604 specifies the live mode, then the facility continues in step 605; if it specifies the follow mode, then the facility continues in step 606; if it specifies the forkable mode, then the facility continues in step 607; if it specifies the pinned mode, then the facility continues in step 612; if it specifies the special forkable mode, then the facility continues in step 613; and if it specifies the special follow mode, then the facility continues in step 614.

In step 605, where the live mode is specified, the facility sets edit in context to yes for the reference, and sets version selection to latest. After step 605, the facility continues in step 604 to permit the user to, at a later time, specify a new mode for this fragment. In step 606, where the follow mode is specified, the facility sets edit in context to no for the reference, and sets version selection to latest. After step 606, the facility continues in step 604. In step 607, where the forkable mode is specified, the facility sets edit in context to yes for the reference, and sets version selection to the current time, or an earlier time selected by the user. In step 608, if the user chooses to edit the fragment in the context of the reference, then the facility continues in step 609, else the facility continues in step 604. In step 609, the faculty creates a new fragment that reflects application of the edit of step 608 to the added fragment. The new fragment has a different fragment ID than the added fragment. In step 610, the facility populates the current component of the fragment reference with the new fragment's fragment ID. In step 611, the facility changes the reference's mode to live. After step 611, the facility continues in step 605. In step 612, where the pinned mode is specified, the facility sets edit in context to no for the reference, and sets version selection to the current time, or to an earlier time selected by the user. After step 612, the facility continues in step 604. In step 613, where the special forkable mode is specified, the facility sets edit in context to yes, and sets version selection to a version selection rule, such as a version selection rule specified via additional user interactions, a default version selection rule, an inferred version selection rule, etc. After step 613, the facility continues in step 608. In step 614, where the special follow mode is specified, the facility sets edit in context to no, and sets version selection to a version selection rule in a manner similar to step 613. After step 614, the facility continues in step 604.

Those skilled in the art will appreciate that the steps shown in FIG. 6 and in each of the flow diagrams discussed below may be altered in a variety of ways. For example, the order of the steps may be rearranged; some steps may be performed in parallel; shown steps may be omitted, or other steps may be included; a shown step may be divided into sub steps, or multiple shown steps may be combined into a single step, etc.

Figure 7:
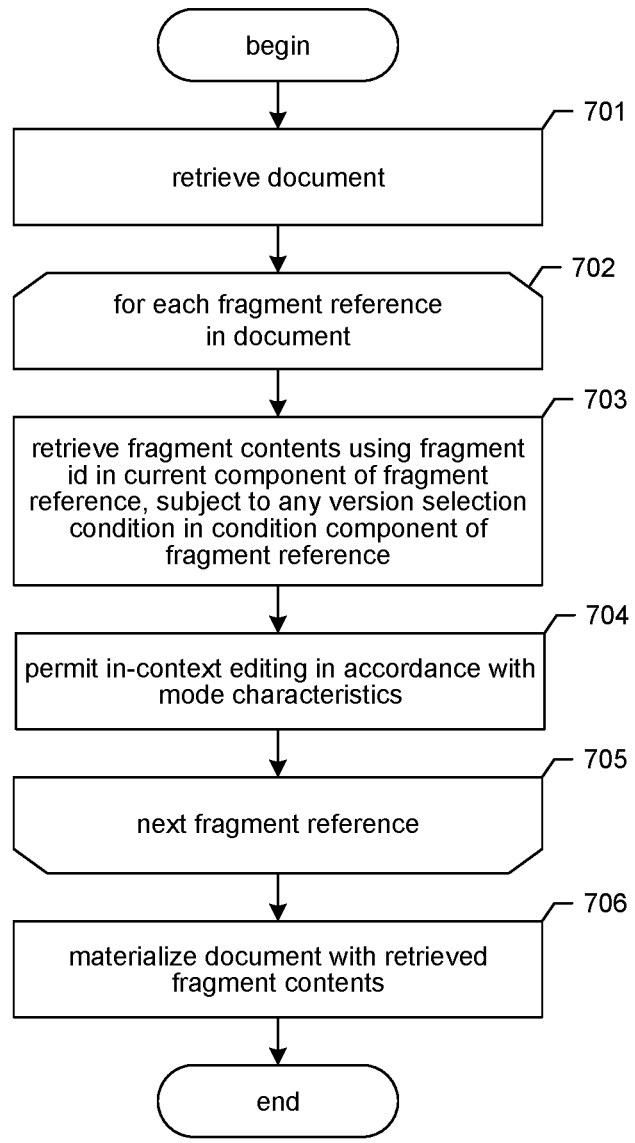
FIG. 7 is a flow diagram showing steps typically performed by the facility in some embodiments in order to materialize a document containing shared fragments.

FIG. 7 is a flow diagram showing steps typically performed by the facility in some embodiments in order to materialize a document containing shared fragments. In various embodiments, the facility performs these steps when a document is opened, when a document needs to be displayed, when a user attempts to add it to document, etc. In various embodiments, the facility's performance of these steps is distributed between the client and servers in various ways. In step 701, the facility retrieves a document, such as by retrieving its root fragment. The facility loops through steps 702-704 for each fragment reference occurring in the document, including transitive fragment references from one fragment to another. In step 703, the facility retrieves content of the fragment using the fragment ID contained in the current component of the fragment reference. This retrieval is subject to any version selection condition contained in the condition component of the fragment reference; that is, the retrieval is performed with respect to the latest version of the fragment that specifies any contained version selection condition, or, absent a version selection condition, the latest version of the fragment. In various embodiments, the facility uses various forms of fragment version selection logic. In some embodiments, the process of retrieving a fragment indicates permissions associated with the fragment, including whether the fragment can be edited by the current user, which the facility uses to indicate and control whether the user can edit the fragment in the context of the document. Fragment retrieval is discussed in greater detail below in connection with FIGS. 8-11. In step 704, the facility makes the fragment editable in context based on the mode of the fragment reference. In step 705, if additional fragment references remain to be processed, then the facility continues in step 702 to process the next fragment reference, else the facility continues in step 706. In step 706, the facility materializes the document using the fragment contents retrieved in step 703. After step 706, these steps conclude. In some embodiments (not shown), rather than performing the processing shown in FIG. 7 in a loop, the facility performs it as a recursive descent of a tree-like graph with lenses acting as parents of content nodes, and modifying rendering behavior as the document is materialized.

Figure 8:
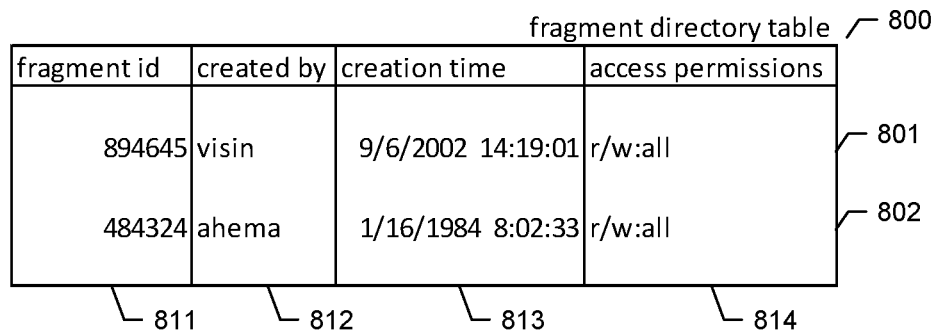
FIG. 8 is a table diagram showing sample contents of a fragment directory table used by the facility in some embodiments to store information about fragments.
Figure 9:
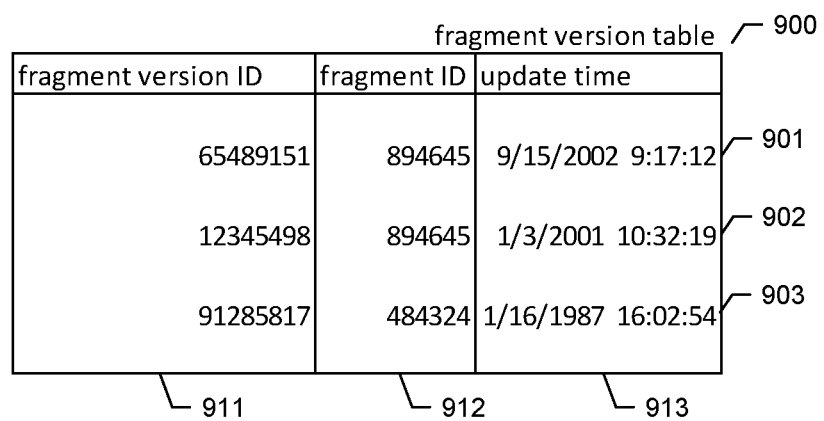
FIG. 9 is a table diagram showing sample contents of a fragment version table used by the facility in some embodiments to store information about fragment versions.

FIG. 8 is a table diagram showing sample contents of a fragment directory table used by the facility in some embodiments to store information about fragments. In some embodiments, the fragment directory table, and the other tables described in FIGS. 9-11, are stored in a data center on a storage device accessible to servers executing server software that is part of the facility. In some embodiments, some or all of these tables are stored in multiple data centers in order to provide survivability and a measure of locality for the data they store. The fragment directory table 800 is made up of rows such as rows 801-802 each corresponding to a different fragment. Each row is divided into the following columns: a fragment ID column 811 containing a fragment ID identifying the fragment to which the row corresponds; a created by column 812 containing information identifying a user that created the fragment; a creation time column 813 having contents indicating the time at which the fragment was created; and an access permissions column 814 specifying the ways in which the fragment can be accessed by various users. For example, row 801 indicates that a fragment having fragment ID 894645 was created by user vision at Sep. 6, 2002 14:19:01, and can be read and written by all users. In some embodiments, the facility employs geographically-invariant times, such as times expressed in Greenwich Mean Time, in order to coordinate servers and clients located in different time zones. Where the server receives a retrieval request for fragment ID 894645, it uses row 801 to determine access permissions for this fragment.

While FIG. 8 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

FIG. 9 is a table diagram showing sample contents of a fragment version table used by the facility in some embodiments to store information about fragment versions. In particular, the facility uses the fragment version table to identify the different versions of a fragment that exist, and their time order. In some embodiments, the facility maintains only a single version of each fragment, in which case the fragment version table is not necessary, and fragment IDs are substituted for fragment version IDs in other tables maintained by the facility. The fragment version table 900 is made up of rows such as rows 901-903 each corresponding to a different fragment version. Each of the rows is divided into the following columns: a fragment version ID column 911 containing a fragment version ID for the fragment version to which the row corresponds that uniquely identifies this fragment version; a fragment ID column 912 containing the fragment ID identifying the fragment to which this fragment version corresponds; and an update time column indicating the time at which the fragment version was last updated. For example, row 901 indicates that the fragment version having fragment version ID 65489151 corresponds to the fragment having fragment ID 894645, and was last updated at Sep. 15, 2002 9:17:12. Where the server receives a retrieval request for fragment ID 894645, it uses rows 901 and 902 to identify the two fragment versions that exist for this fragment ID. These two rows can also be used to determine which of the fragment versions is more recent.

In some embodiments, where fragment versions are used, some fragment versions are writeable, such that an author can change the content at a time after it is created, at least in the case of fragment versions that are not referenced by any pinned fragment references. However, in some embodiments, every fragment version is read-only, and any revision of content contained by an existing fragment version causes the facility to create a new fragment version. In various embodiments, the creation of a new fragment version occurs at various levels of granularity, including a new fragment version for each editing session, a new fragment version for each keystroke, or at some level in between, such as every five seconds, every minute, every 15 minutes, etc.

FIG. 10 is a table diagram showing sample contents of a fragment version instance table used by the facility in some embodiments to store information about fragment version instances. In particular, the facility uses the fragment version instance directory table to identify, for particular fragment version, instances of the fragment version that are stored on different servers, so that the facility can choose one of the fragment versions for retrieval, and so that, if a fragment version is being changed in an embodiment where this is possible, every instance of it can be changed or invalidated. The fragment version instance directory table 1000 is made up of rows such as rows 1001-1008 each corresponding to a different combination of a fragment version and a server on which an instance of the fragment version is stored. Each row is divided into the following columns: a fragment version ID column 1011 containing if fragment version ID identifying the fragment version; and a server ID column 1012 identifying a server on which an instance of the fragment version is stored. For example, row 1001 indicates that the fragment version having fragment version ID 12345498 has an instance stored on the server having server ID 9103. In various embodiments, the facility uses various other approaches to identifying locations in which instances of fragment versions are stored, such as by using data center IDs, storage device IDs, etc.

FIG. 11 is a table diagram showing sample contents of a fragment version instance content table used by the facility in some embodiments to store fragment version instance content. The fragment version instance content table 1100 is made up of rows such as rows 1101-1103 each corresponding to fragment version instances all stored on a particular server. The fragment version instance content table 1100 is, in particular, stored on the server having server ID 9103. Each of the rows is divided into the following columns: a fragment version ID column 1111 containing the fragment version ID identifying the fragment version to which the row corresponds; an update time column 1112 indicating the time at which the fragment version instance was last updated; and a fragment contents column 1113 containing the contents of the fragment version instance. For example, row 1101 indicates that the fragment version instance having fragment version ID 91285817 and update time Jan. 16, 1987 16:02:54 contains particular image data. It is the fragment 1113 that contains the data that the facility returns in response to a fragment retrieval request.

In some embodiments, rather than storing each fragment version instance as a single entity as shown in FIG. 11, the facility employs an "erasure coding" technique in which it distributes the contents of each fragment version instance as any number of smaller shreds, which can be stored on any arrangement of servers.

In some embodiments, the facility provides a computing system for incorporating content into a target document. The computing system comprises: a memory configured to store the target document; a document fragment retrieval subsystem configured to retrieve contents of a document fragment corresponding to a specified identifier; and a content incorporation subsystem configured to insert into the target document in the memory a document fragment reference containing a distinguished identifier that, when specified to the document fragment retrieval subsystem, produces the content. Each of these subsystems is a computing-related entity, comprising either hardware, a combination of hardware and software, software, or software in execution on a computer.

In some embodiments, the facility provides a computer-readable medium having contents configured to cause a computing system to, in order to materialize a first document: identify within the first document a reference to a document fragment; use an identifier contained in the identified reference to retrieve document fragment contents stored separately from the first document; and cause the retrieved document fragment contents to be displayed in context of the first document.

In some embodiments, the facility provides a method in a computing system for materializing a first document. The method comprises: identifying within the first document a reference to a document fragment; using an identifier contained in the identified reference to retrieve document fragment contents stored separately from the first document; and causing the retrieved document fragment contents to be displayed in context of the first document.

In some embodiments, the facility provides a computer-readable medium storing a data structure representing a document. The data structure comprises: information directly specifying document contents; and at a selected position within the information directly specifying document contents, a document portion reference, the document portion reference containing a first identifier usable to retrieve supplemental document contents stored separately from the data structure for inclusion at the selected position within the directly specified document contents.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computing system for incorporating content into a target document, the computing system comprising:
a memory configured to store the target document; and
a processing unit configured, via execution of a computer program, to
receive input from a user selecting content to include in the target document,
in response to the input from the user, insert a document fragment reference into the target document, the document fragment reference including a fragment identifier and a version identifier, the fragment identifier associated with a stored fragment and the version identifier associated with one of a plurality of versions of the stored fragment, the one of the plurality of versions of the stored fragment including the content selected by the user,
materialize the target document to the user by identifying the stored fragment associated with the fragment identifier and selecting the one of the plurality of versions of the stored fragment associated with the version identifier and replacing the document fragment reference with the content included in the one of the plurality of versions of the stored fragment,
receive an edit to the content as materialized in the target document from the user, and
in response to receiving the edit,
create and store a new version of the stored fragment for inclusion in the plurality of versions of the stored fragment, the new version of the stored fragment including the content as edited and an identifier of the user as an author,
associate the new version of the stored fragment with a new version identifier,
replace the version identifier in the target document with the new version identifier, and
materialize the target document to the user including the content as edited by identifying the stored fragment associated with the fragment identifier, selecting the new version of the stored fragment from the plurality of versions of the stored fragment associated with the new version identifier, and replacing the document fragment reference with the content included in the new version of the stored fragment.

2. The computing system of claim 1, wherein the processing unit is further configured to materialize a second target document including a second document fragment reference including the fragment identifier by identifying the stored fragment associated with the fragment identifier, selecting one of the plurality of versions of the stored fragment based on a mode of incorporation, and replacing the second document fragment reference with content included in the selected one of the plurality of versions of the stored fragment.

3. The computing system of claim 2, wherein the processing unit is configured to select the one of the plurality of versions of the stored fragment based on the mode of incorporation by selecting the one of the plurality of versions of the stored fragment based on the identifier of the author included in at least one of the plurality of versions of the stored fragment.

4. The computing system of claim 2, wherein the processing unit is configured to select the one of the plurality of versions of the stored fragment based on the mode of incorporation by selecting the one of the plurality of versions of the stored fragment based on the identifier of the author and a date and time included in at least one of the plurality of versions of the stored fragment.

5. The computing system of claim 1, wherein the processing unit or a second processing unit is configured to access one of the plurality of versions of the stored fragment, decompose the accessed one of the plurality of versions of the stored fragment into a plurality of constituent pieces, and store the plurality of constituent pieces in a plurality of different data centers.

6. The computing system of claim 5, wherein the processing unit or the second processing unit is further configured to materialize a third target document including a version identifier associated with the accessed one of the plurality of versions of the stored fragment, retrieve each of the plurality of constituent pieces of the accessed one of the plurality of versions of the stored fragment from the plurality of different data centers and reconstitute the accessed one of the plurality of versions of the stored fragment.

7. The computing system of claim 1, wherein the edit to the content received from the user includes at least one selected from a group consisting of an insertion of at least one character into the content via a keystroke or a block paste and a deletion of at least one character from the content via a keystroke or a select-and-delete operation.

8. The computing system of claim 1, wherein the processing unit is further configured to set the new version of the stored fragment to immutable and prevent the user or a second user from altering the new version of the stored fragment.

9. The computing system of claim 1, wherein the processing unit is further configured to automatically combine edits associated with two or more versions of the plurality of versions of the stored fragment into a retained one of the plurality of versions of the stored fragment and delete the two or more versions from the plurality of versions of the stored fragment.

10. The computing system of claim 9, wherein the two or more versions and the retained one of the plurality of versions of the stored fragment include contiguous versions with the same identifier of the author.

11. The computing system of claim 1, wherein, in response to receiving the input from the user selecting the content to include in the target document, the processing unit is further configured to
determine whether the selected content spans only a portion of original content associated with the stored fragment, and
in response to determining the selected content spans only a portion of the original content associated with stored fragment, automatically break the stored fragment into a first fragment and a second fragment, the first fragment associated with the portion of the original content corresponding to the selected content and the second fragment including a remaining portion of the original not selected by the user,
wherein the fragment identifier included in the document fragment reference inserted into the target document includes a fragment identifier associated with the first fragment.

12. A computer-readable medium having contents configured, to materialize a document, to cause a computing system to:
identify within the document stored in a first data store a reference to a document fragment and a mode of incorporation for the referenced document fragment, the mode of incorporation including a version selection rule defining an available version of the referenced document fragment to incorporate into the document based on a specified author;
access a plurality of versions associated with the referenced document fragment stored in a second data store separate from the first data store, each of the plurality of versions including content and an identifier of an author of the content;
select, using the version selection rule included in the mode of incorporation, one of the plurality of versions based on the identifier of the author included in at least one of the plurality of versions being associated with the specified author defined by the version selection rule;
retrieve content included in the selected one of the plurality of versions;
display the retrieved content within the document;
receive input from a user editing the content displayed within the document; and
store the content as edited by the user in the second data store as a new version of the plurality of versions with an identifier of the user as an author of the content as edited.

13. The computer-readable medium of claim 12, wherein the contents are further configured to cause the computing system to set the new version of the plurality of versions as immutable and prevent the user or a second user from altering the altered content.

14. The computer-readable medium of claim 12, wherein the contents are further configured to cause the computing system to receive input from a second user editing the content included in the new version and store the content as edited by the second user as a second new version of the plurality of versions with an identifier of the second user an author of the content included in the second new version.

15. The computer-readable medium of claim 12, wherein the contents are further configured to cause the computing system to automatically combine edits associated with two or more versions of the plurality of versions into a retained one of the plurality of versions and delete the two or more versions from the plurality of versions.

16. The computer-readable medium of claim 15, wherein the two or more versions and the retained one of the plurality of versions include contiguous versions with the same identifier of the author.

17. A method for editing a document, the method comprising
identifying, with a processing unit, a document fragment reference in the target document, the document fragment reference including a fragment identifier and a mode of incorporation, the fragment identifier associated with a stored fragment associated with a plurality of versions;
selecting, with the processing unit, one of the plurality of versions based on the mode of incorporation;
retrieving, with the processing unit, content included in the one of the plurality of versions;
materializing, with the processing unit, the document by replacing the document fragment reference with the content included in the one of the plurality of versions;
receiving, with the processing unit, an edit to the content as materialized in the document from a user;
creating and storing, with the processing unit, a new version of the stored fragment for inclusion in the plurality of versions, the new version of the stored fragment including the content as edited and an identifier of the user as an author of the content as edited;
associating, with the processing unit, the new version of the stored fragment with a new version identifier; and
replacing, with the processing unit, the version identifier in the document with the new version identifier.

18. The method of claim 17, wherein selecting the one of the plurality of versions based on the mode of incorporation includes selecting the one of the plurality of versions based on an identifier of an author associated with at least one of the plurality of versions.

19. The method of claim 17, further comprising automatically combining edits associated with two or more versions of the plurality of versions into a retained one of the plurality of versions and deleting the two or more versions from the plurality of versions.

20. The method of claim 19, wherein the two or more versions and the retained one of the plurality of versions include contiguous versions with the same identifier of the author.

* * * * *